United States Patent [19]
Smith

[11] Patent Number: 6,095,179
[45] Date of Patent: Aug. 1, 2000

[54] FLOOD CONTROL VALVE ASSEMBLY

[76] Inventor: Karl Smith, 1620 S. Ocean Blvd., Apt. 5-K, Pompano Beach, Fla. 33062

[21] Appl. No.: 09/251,214

[22] Filed: Feb. 16, 1999

[51] Int. Cl.[7] .............................. F16K 15/04; F16K 31/22
[52] U.S. Cl. .................... 137/247.23; 137/362; 137/433; 137/454.2
[58] Field of Search ......................... 137/247.15, 247.21, 137/247.23, 362, 433, 454.2

[56] References Cited

U.S. PATENT DOCUMENTS

| | | | |
|---|---|---|---|
| 576,790 | 2/1897 | O'Brien | 137/433 X |
| 790,322 | 5/1905 | Shay | 137/247.21 X |
| 844,003 | 2/1907 | Conrad . | |
| 859,540 | 7/1907 | Bonnell | 137/433 |
| 1,469,790 | 10/1923 | Hysko . | |
| 1,753,724 | 4/1930 | Shaw | 137/454.2 X |
| 2,476,434 | 7/1949 | Spang . | |
| 2,531,721 | 11/1950 | Brock . | |
| 2,757,752 | 8/1956 | Kaufman | 137/454.2 X |
| 2,787,376 | 4/1957 | Coulson | 137/433 X |
| 2,843,146 | 7/1958 | Kirschner | 137/433 |
| 2,871,875 | 2/1959 | Dale | 137/433 |
| 3,903,918 | 9/1975 | Carnarius . | |
| 4,088,149 | 5/1978 | Logsdon . | |
| 4,296,778 | 10/1981 | Anderson | 137/454.2 X |
| 4,936,338 | 6/1990 | Fonoimoana . | |

FOREIGN PATENT DOCUMENTS

| | | | |
|---|---|---|---|
| 46275 | 9/1932 | Denmark | 137/247.23 |

*Primary Examiner*—John Rivell
*Attorney, Agent, or Firm*—Malloy & Malloy, P.A.

[57] ABSTRACT

A flood control valve assembly designed to be removably mounted within the outer or exposed end of a vertically or horizontally oriented drain pipe and structured to allow water to enter the drain pipe in the conventional fashion but prevent water from issuing from the open, outer end of the drain pipe such as during heavy rain and/or flood conditions. The valve assembly includes a tubular housing having a hollow interior and oppositely disposed open ends which define a path of liquid flow through the housing. The housing is removably secured on the interior of the drain pipe immediately adjacent to the open end thereof and further includes a buoyant material valve member movably mounted within the housing and being positionable into an out of a closed position relative to a valve seat secured adjacent to the outer end of the housing dependent upon the direction of water flow through the housing.

16 Claims, 4 Drawing Sheets

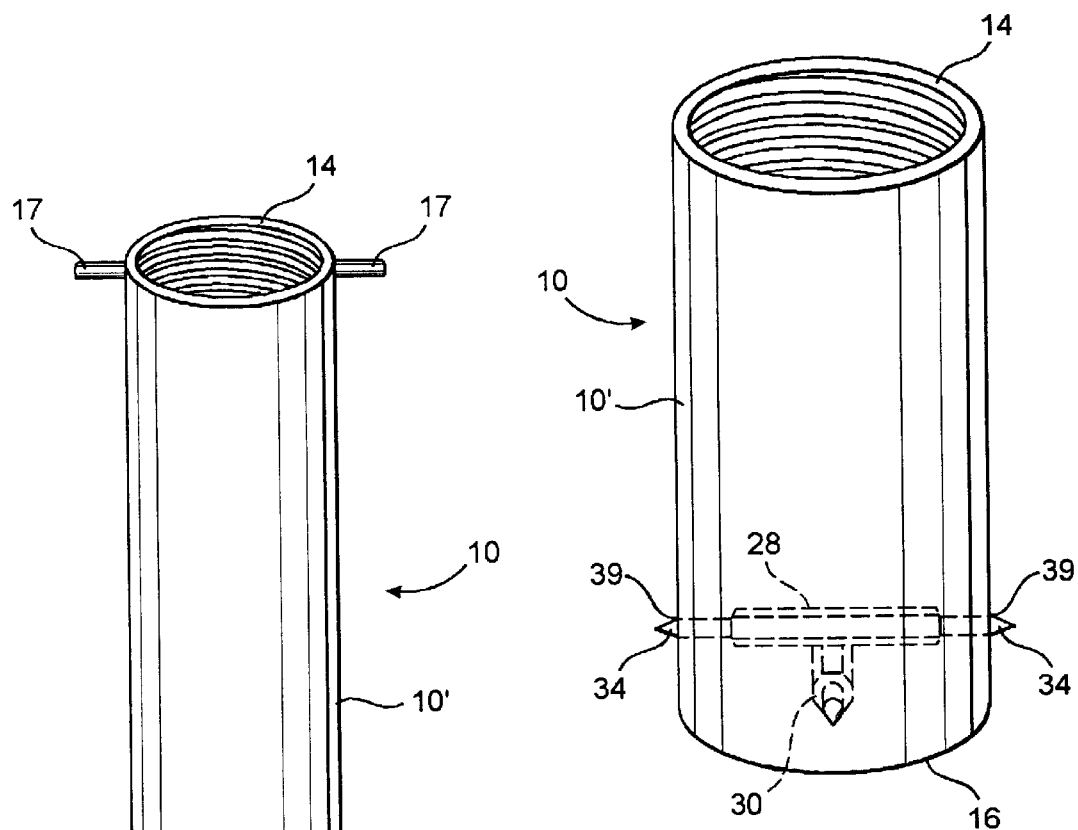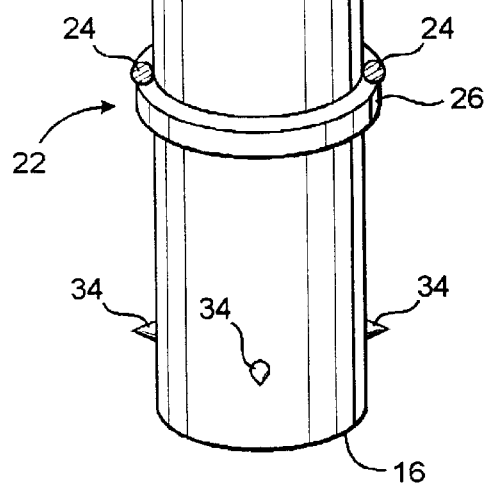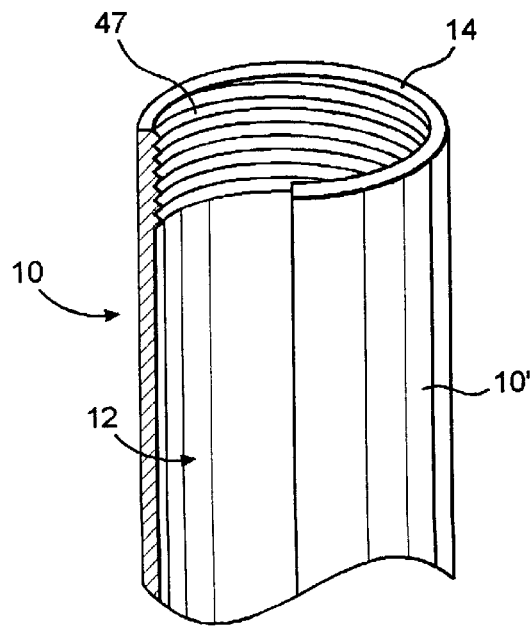
FIG. 1A
FIG. 1B
FIG. 2

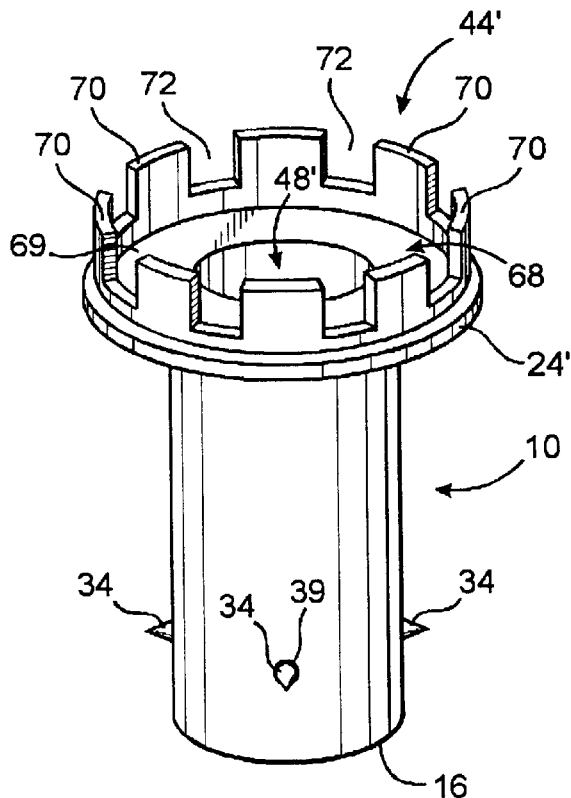
FIG. 9
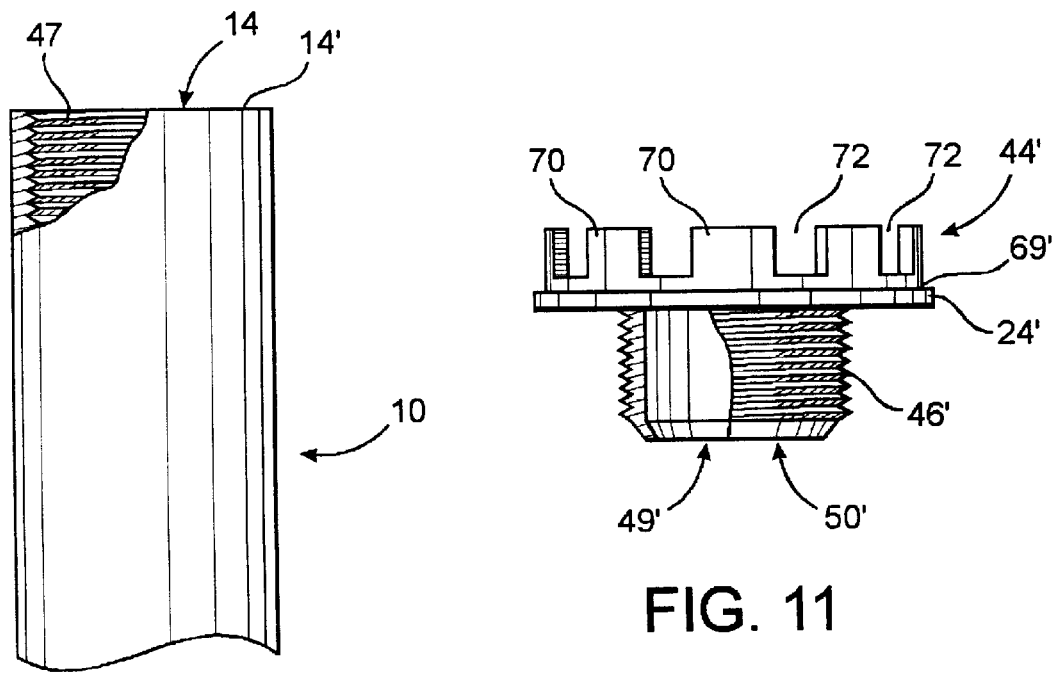
FIG. 10
FIG. 11

FLOOD CONTROL VALVE ASSEMBLY

BACKGROUND OF THE INVENTION

1. Field of the Invention

This invention relates to a valve assembly designed to be removably attached within the interior of and adjacent to the outer, exposed end of a drain pipe or sewer pipe permanently or fixedly installed in any of a variety of locations, wherein the drain pipe is used to remove water from a given location and direct the water to a sewer or drain facilities. The valve assembly of the present invention is structured to prevent back flow of water through the drain pipe and prevent the issuing of water therefrom which would normally otherwise occur during flood conditions.

2. Description of the Related Art

Drain pipes and sewer pipes are well known. Normally, such pipes are permanently installed in a variety of different locations such as basements, parking lots, and underground parking structures in particular, garages, roofs of large buildings, etc. in order to direct water collected therein to a network of conduits or pipes, located beneath the ground, basement or like area, which define conventional drain or sewer facilities. Typically, the outer, open end of such standing drain pipes is covered with a perforated or apertured plate which serves to prevent relatively large objects from entering the drain pipe and possibly causing a clogging of the drain pipe and/or associated sewer facilities. Regardless of the locations of such drain or sewer pipes, the occurrence of a back flow of water therethrough is relatively common. More specifically, during unusual conditions such as heavy rain, thawing of ice or snow, floods, etc. large amounts of water can accumulate within the conventional sewer or drain facilities. The unusually increased quantity of such water results in the likelihood that the water will "back flow" through the individual drains connected to the common drain facility, thereby causing the water to enter and flood certain areas in which the vertical or horizontal drain pipes are located, such as basements, underground parking garages, and the like. Naturally, this is a serious problem which has long been endured due to the fact that drain pipes and like drain facilities are necessary to maintain the surrounding areas dry under normal circumstances.

Whenever such back flow of water occurs, there is a distinct possibility of damage to any item or items located in the surrounding areas in which the permanently installed drain or sewer pipes are located. In addition, if the drain(s) installed within an underground parking structure over-flow with water, drivers and their passengers are considerably inconvenienced, as there might not be a dry parking space available. In addition, such persons are not permitted to enter or exit their vehicles without getting their feet wet, which is not only undesirable, but might lead to a slip and fall type of injury.

As a result, numerous attempts have been made to construct various devices aimed at preventing the back flow of water through an existing drain pipe, while still allowing water to flow into the existing drain pipe in a conventional and intended manner. Such devices normally involve some type of check valve which are not necessarily adequately adapted for use with or within a standing, permanently installed drain or sewer pipe. More in particular, conventional check valves are typically constructed to include specifically formed valve or valve housing components, which cannot readily be installed within a conventional drain pipe or drain facility without significant difficulty. Also, conventional check valves are typically designed and structured in a manner which makes it difficult or impossible to remove and replace worn parts without damaging the existing drain pipe or facility. In addition, it is believed that devices known in the art which attempt to address the aforementioned back flow of water in drain pipes have all been directed to assemblies which require that the outer end of the permanently installed drain pipe be exposed as a preliminary step, such as by drilling the concrete, asphalt or other material around the drain pipe, in order to install such devices whether on the drain pipe or into the floor, pavement or other foundation in which the drain pipe is located. In addition, once such known devices are installed, the floor, pavement or other foundation in which the drain pipe is located must then be patched, and consequently, such known devices are also permanently installed. As a result, such permanent or fixed installation or attachment of a check valve or other such known device to the existing drain facilities is cumbersome, complex and time consuming, and in general, is not an economically efficient nor workable solution for use with or adaptation to a vast majority of permanently installed drain pipes.

Therefore, there is a recognized need in this art for a flood control valve assembly which is specifically adapted to be attached to a permanently or fixedly installed drain pipe or sewer pipe in a manner which eliminates the need for digging into or otherwise destroying the asphalt, concrete or like material of a driveway, sidewall or even well manicured lawn which surrounds the drain pipe so as to expose its upper end, and further, which does not require that the flood control valve assembly be fixedly or permanently attached to the drain pipe itself. Any such flood control valve assembly that is developed should be removably attached to the drain pipe, and ideally, should be capable of being easily removed from its intended, operative position relative to a drain pipe or sewer pipe, and further, should be capable of having the various components thereof independently detached from one another and from the overall assembly for repair, replacement or maintenance thereof.

SUMMARY OF THE INVENTION

The present invention relates to a flood control valve assembly designed and structured to prevent the back flow of water through drain pipes or sewer pipes, such as, but not limited to, those found in underground parking garages and basements, which typically are permanently installed. The flood control valve assembly of the present invention is well suited for use in drain pipes which are already existing in an erected building structure, which may be disposed either in a vertical or horizontal orientation dependent on their specific purpose and point of installation.

More specifically, the present invention comprises a housing, which preferably, has a substantially elongated and hollow configuration, and which terminates at oppositely disposed, open ends, one of which may be define an outer end and the other of which may define an inner end. Preferably, the housing is dimensioned such that its outer diameter or transverse dimension is at least minimally less than the interior diameter or transverse dimension of the drain or sewer pipe in which it is installed, in order that the housing may be disposed on the interior of the drain pipe. Most preferably, the housing is disposed within the drain pipe in correspondingly aligned position with the drain pipe, such that the outer, open extremity of the drain pipe is immediately adjacent or contiguous to the outer, open end of the housing.

One inventive feature of the present invention is the removable mounting or connection of the housing, as well as the remaining components of the flood valve assembly of the present invention, on the interior of the drain pipe. To accomplish such removable attachment, the present invention also comprises an attachment assembly, which is preferably adjustably disposed at least partially within the interior of the housing. The attachment assembly is preferably defined by at least one, but preferably, two cross members disposed in substantially transverse relation to one another, and further, which are specifically structured such that their length may be varied. A specific structural embodiment of each of the cross members may take the form of a hexagon shaped turnbuckle or "hex-turnbuckle" having a threaded bolt protruding from each opposite end thereof. Further, the opposite extremities of each of the threaded bolts preferably have a sharpened or pointed configuration which extends through pre-formed openings or apertures in the body of the housing such that the sharpened ends of the cross members may penetrate, and thereby, removably engage the interior surface of the standing drain pipe. By virtue of this interconnection, the housing is held in a preferred, concentric orientation within the drain pipe, but may be readily and quickly removed therefrom for purposes of repair, replacement or maintenance.

As explained in greater detail hereinafter, the attachment assembly comprising the one or two cross members also serves to retain a valve member on the interior of the housing. The valve member is preferably formed of a buoyant material, such that its position within the hollow interior of the housing is dependent not just upon gravity, but also by the collection of water and/or direction of water flow therethrough. Ideally, the valve member comprises a spherical configuration, such as a ball or bobber, which is specifically dimensioned and configured to freely move within the interior of the housing between the retaining cross members and a valve seat, which will briefly be described next, and in greater detail hereinafter.

The flood control valve assembly of the present invention also includes a valve seat. In the preferred embodiment, the valve seat is integrally or otherwise fixedly mounted on or secured to a head assembly which is removably attached immediately adjacent to, and in certain preferred embodiments to be described in greater detailed hereinafter, to extend at least minimally outward from the outer open end of the housing. The head assembly has a hollow interior and an open proximal end disposed contiguous to or at least minimally outward from the outer open end of the housing. The opposite or distal open end of the head assembly is disposed within the housing in spaced relation to the outer end thereof, and the interior of the head assembly serves to define at least a portion of the flow path of water which passes through the housing from the outer, exposed open end of the standing drain pipe. The valve seat, which is a part of or secured to the head assembly is specifically dimensioned, disposed and configured to be sealingly engaged by the valve member to define a closed position of the valve seat and valve member. When the valve seat and valve member assume such a closed position, water will be prevented from passing back through the housing assembly, and accordingly, will be prevented from "back flowing" through the outer, exposed open end of the drain pipe.

Other structural features of the flood control valve assembly of the present invention include a sealing assembly, preferably in the form of an "O"-ring and/or other sealing or packing material secured and/or selectively positioned about the outer surface of the housing, and specifically dimensioned and configured to sealingly engage the interior surface of the drain pipe. Such sealing engagement between the outer surface of the housing and the interior surface or the drain pipe prevents the back flow or passage of water between the housing and the interior surface of the drain pipe. Accordingly, during flooding or like unusual conditions the water is thereby forced to pass into the open inner end of the housing and through the interior thereof, and will accomplish the forced positioning of the valve member into sealing engagement with the valve seat to prevent the aforementioned back flow of water out the open outer end of the housing.

Therefore, it is a primary object of the present invention to provide a flood control valve assembly to be removably mounted within a conventional, permanently installed drain pipe or sewer pipe in a manner which will prevent the back flow of water therethrough.

Another primary object of the present invention is to provide a flood control valve assembly which allows the flow of water into a drain pipe in the conventional manner for the channeling of such water to the drain or sewer facilities while preventing the back flow of water through the drain pipe in an opposite direction.

Still another important object of the present invention is to provide a flood control valve assembly which may be easily installed and removed from its operative position relative to an existing, permanently installed drain pipe in a manner which will not destroy or otherwise damage the drain pipe and which will allow the removal and/or replacement of the entire flood control valve assembly or any associated component thereof.

It is also an important object of the present invention to provide a flood control valve assembly capable of having the various components thereof being detached or disconnected from one another and from their intended operative position for purposes of maintenance, repair and/or replacement.

It is yet another important object of the present invention to provide a flood control valve assembly capable of being removably attached to a fixed or permanently installed drain pipe and comprising a plurality of components which are formed from durable, high strength, noncorrosive material of simple design and structure, thereby rendering the valve assembly commercially available to a large segment of the consuming public.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1A is a perspective view of a housing portion of the flood control valve assembly of the present invention.

FIG. 1B is a perspective view of the embodiment of FIG. 1A in partial phantom.

FIG. 2 is a perspective view in partial cut-away showing interior portions of the embodiment of FIG. 1.

FIG. 9 is a perspective view of another preferred embodiment of the present invention.

FIG. 10 is a front view in partial cut-away and section of a portion of the embodiment of FIG. 9.

FIG. 11 is a front view in partial cut-away and section of a portion of the embodiment of FIG. 9.

Like reference numerals refer to like parts throughout the several views of the drawings.

DETAILED DESCRIPTION OF THE PREFERRED EMBODIMENT

Figure 3:
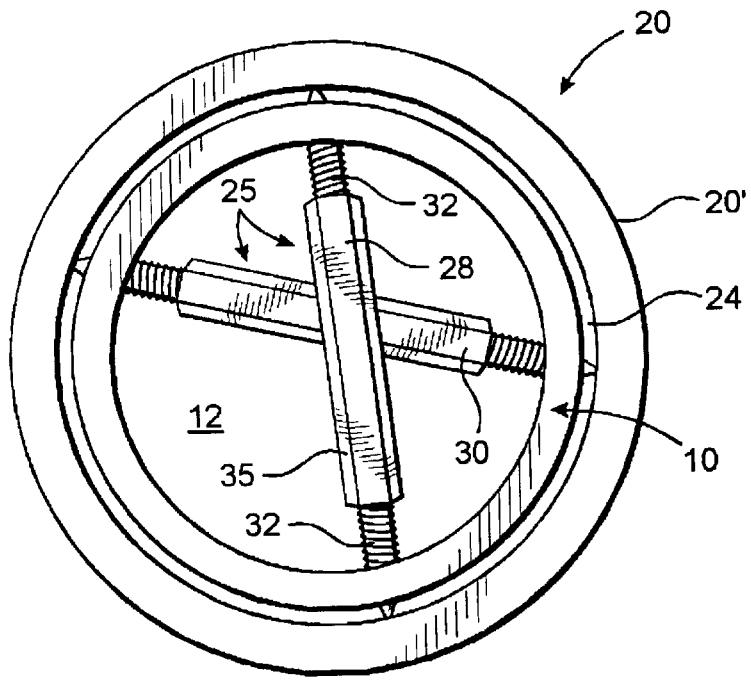
FIG. 3 is a top, transverse sectional view showing another embodiment of the present invention.
Figure 8:
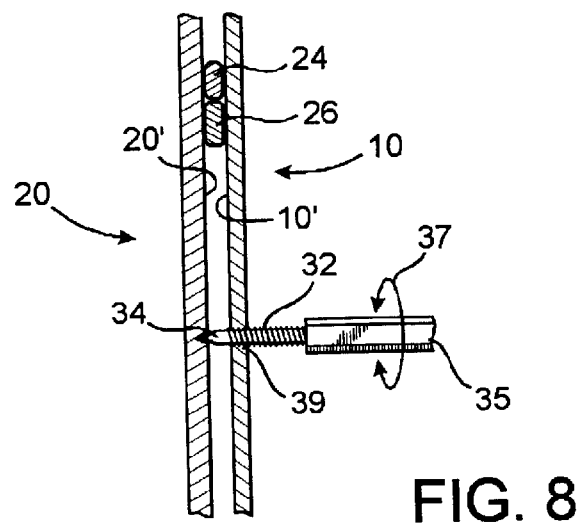
FIG. 8 is a longitudinal sectional view in partial cutaway of certain structural features of the embodiments of FIGS. 1 through 6.

As shown in the accompanying Figures, the flood control valve assembly of the present invention comprises a housing, generally indicated as 10, which preferably has an elongated configuration and a hollow interior 12 extending along the length thereof. The housing 10 includes an upper or outer open end, generally indicated as 14, and a lower open end, generally indicated as 16. The housing 10 may be formed from any of a variety of relatively lightweight, durable, high strength, noncorrosive materials such as plastic, PVC, or the like, and is specifically structured to come in a variety of sizes so as to be removably attached to and to fit within anyone of a plurality of different sized drain or sewer pipes, generally indicated as 20, as shown in FIG. 8, which may be fixedly and/or permanently installed at any of a variety of conventional locations to accomplish the drainage and/or removal of water from such a site or location. As will become more apparent hereinafter, the transverse dimension or outside diameter of the housing 10 is such as to fit within an end portion of the vertical or horizontal, permanent drain pipe 20 and be at least minimally spaced from the interior surface 20' thereof, as shown in FIGS. 3 and 8. Regardless of the size of the spacing between the exterior surface 10' of the housing 10, see FIGS. 1-B and 2, and the interior surface 20' of the standing drain pipe 20, it is preferable to prevent water from passing therebetween. Accordingly, one preferred embodiment of the present invention comprises a sealing means generally indicated as 22 in FIG. 1A. The sealing means 22 may comprise an O-ring or like gasket member 24 and/or a packing joint stopper 26 both of which are secured about the exterior surface 10' of the housing 10 in the manner shown both in FIGS. 1A and 8. In the embodiment of FIG. 1A, the O-ring 24 may be adjustably positioned along the length of the exterior surface 10' of the housing 10 so as to selectively locate the O-ring in a desired location and into sealing engagement with the interior surface 20' of the standing drain pipe 20.

Figure 4:
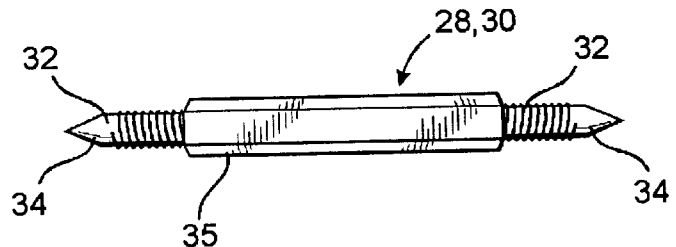
FIG. 4 is a perspective view in detail showing certain structural components of the embodiment of FIG. 3.

With primary reference to FIGS. 3 and 4, the flood valve assembly of the present invention further includes an attachment assembly, generally indicated as 25, comprising at least one but preferably, at least two cross members 28 and 30. The cross members 28 and 30 are disposed on the interior 12 of the housing 10 in a transverse relation to the length thereof. In a most preferred embodiment, each of the cross members 28 and 30 may be defined a "hex-turnbuckle" shown in detail in FIG. 4. More specifically, each of the cross members 28 and 30 preferably includes oppositely disposed, bolt segments, as at 32, each of which has an extremity configured into a pointed or sharpened configuration, as at 34. The operative structuring of the turnbuckle defining each of the cross members 28 and 30 is such that the length or longitudinal dimension thereof may be adjusted so as to force the bolt segments 32 outwardly or inwardly relative to the main body 35 by rotation of the body 35 in accordance with directional arrow 37 shown in FIG. 8. With regard to the mounting or installation of the cross members 28 and 30, aligned, oppositely disposed pairs of apertures as at 39 are formed in an appropriate location in the sidewall of the housing 10. Each of the cross members 28 and 30 are disposed within the interior of the housing 10 such that the extremities 34 of the bolt segments 32 extend through the apertures 39 and outwardly from the exterior surface 10' of the housing 10 into penetrating engagement with the interior surface 20' of the standing drain pipe 20 as shown. By virtue of this attachment, the housing 10 of the flood control valve assembly may be removably attached within the interior of the drain pipe 20 in a quick and easy manner, and just as easily, can be detached therefrom so as to accomplish removal of the housing and the various associated components from the drain pipe 20.

Figure 5:
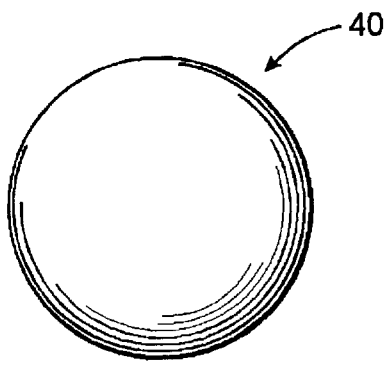
FIG. 5 is perspective view of a valve member associated with the flood control valve assembly of the present invention.

With reference to FIGS. 3 and 5 it should be apparent that the transverse orientation of the cross members 28 and 30 relative to one another and to the longitudinal axis of the housing 10 serves also to retain the valve member, generally indicated as 40 in FIG. 5, within the hollow interior 12 of the housing 10. More specifically, the valve member 40 preferably has a substantially spherical configuration and accordingly is generally defined as a ball valve and is specifically formed of a buoyant material. In addition, the outer diameter of the valve member 40 is such as to be significantly less than the interior diameter of the housing 10 thereby allowing the valve member 40 to freely move within the interior 12 of the housing 10 in accordance with the direction of water flow therethrough. It should be apparent therefore that when water entering the exposed outer end of the standing drain pipe 20 in the conventional and intended manner, passes along a flow path defined at least in part by the interior 12 of the housing 10, it will force the buoyant material valve member 40 into captured or retained engagement with the cross members 28 and 30. Naturally, flow of water in the opposite direction, during back flow conditions, through the interior 12 of the housing 10 will cause the buoyant material valve member 40 to travel in an opposite direction towards the outer, open end of the housing 10 and into a closed position with a valve seat 50, to be defined hereinafter.

Figure 6:
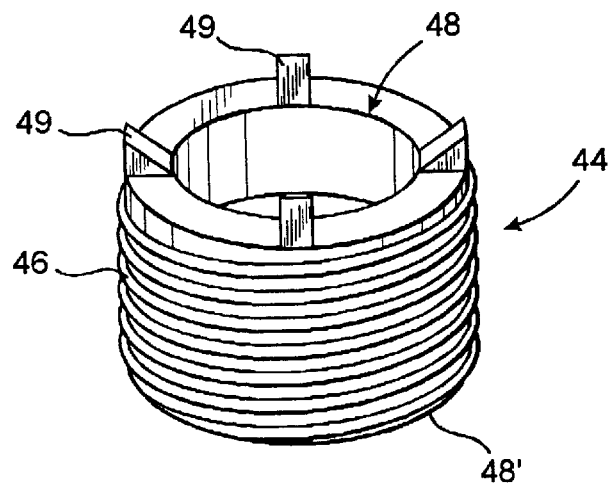
FIG. 6 is a perspective view of another component of the flood control valve assembly of the present invention.
Figure 7:
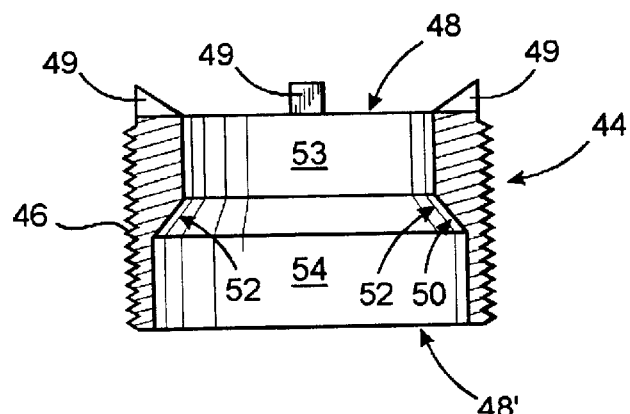
FIG. 7 is a longitudinal sectional view of the embodiment of FIG. 6.

The flood valve assembly of the present invention further comprises a head assembly which in one preferred embodiment disclosed in FIGS. 6 and 7 is generally represented as 44. In the preferred structural embodiment of the head assembly 44, a threaded configuration is integrally formed on the outer surface thereof as at 46. The head assembly 44 also includes an open proximal end generally 48 and an open distal end generally 48'. In addition, a valve seat generally indicated as 50 is integrally formed on the interior surface of the head assembly 44 and is provided in the form of a transitional taper 52 disposed between the upper or outer portion 53 of the interior of the head assembly 44 and the lower or inner portion of the interior of the head assembly 44 as at 54. It is clearly shown that the inner diameter or equivalent transverse dimension of the hollow portion 53 is significantly less than that of the inner or lower portion 54 and more specifically, the disposition and transverse dimension of the valve seat 50 is cooperatively configured and dimensioned with the dimension and configuration of the spherical, valve member 40 to accomplish a sealing engagement therebetween. As a result, flow of water in the opposite direction towards the open, outer end 14 of the housing 10 will force the valve member, at least partially because of the buoyant material from which it is formed, into a sealing engagement with the valve seat 50 thereby preventing the "back flow" of water to continue beyond the valve seat 50 and prevent the issuing of water through the open end 14 of the housing 10. Again, due to the buoyant material from which the valve member 40 is formed, the valve member 40 will automatically "unseat" from the valve seat 50 to allow the flow of water through the outer end 14 and into the interior of the head assembly 44 and housing 10 in the intended manner.

The head assembly 44 is removably mounted immediately adjacent to the outer open end 14 of the housing 10 and on the interior thereof due to the threaded portion 46 formed on the outer surface of the head assembly 44 disposed in matting engagement with the threaded portion 47 formed on the interior 12 of the housing 10 in the location shown in FIG. 2. In order to facilitate rotation of the head assembly 44 relative to the housing 10, one or more up-standing nipples as at 49 may be mounted to project outwardly from the periphery surrounding the open proximal end 48 of the head assembly 44 by facilitating engagement with an appropriately structured tool. Another structural feature of the embodiment of the housing 10 of FIG. 1A is the provision of a plurality of lugs 17 removably attached adjacent the outer end 14. Lugs 17 initially extend outwardly from exterior surface 10' a sufficient distance to overlie the outer most end of the drain pipe 20 and temporarily support the housing 10 thereon in an intended position within the standing drain pipe 20 prior to the cross members 28 and 30 being attached to the interior surface 20' of the drain pipe as shown in FIG. 8. Once the housing 10 is attached in its intended position by securement of the cross members 28 and 30, the lugs 17 are broken away or otherwise removed.

Another, most preferred embodiment is shown in FIGS. 9 through 11 and includes the housing 10 being substantially equivalently structured to the embodiment of FIG. 1 including an open outer end 14 and an oppositely disposed open inner end 16 both of which communicate with the hollow interior 12 of the housing 10. Similarly, attachment of the housing to the interior of the drain pipe 20 is accomplished through the provision of the cross members 28 and 30 in the manner disclosed and described with reference to FIGS. 3, 4 and 8. However, the most preferred embodiment of FIGS. 9 through 11 comprises a head assembly generally indicated as 44' having a hollow interior and an open proximal end 48' an open distal end 49' communicating with the hollow interior thereof. Similarly, the exterior surface is threaded along at least a portion thereof as at 46' for interconnection to the internal threads 47 formed along a portion of the interior surface of the housing 10 as also shown in FIG. 10. However, the head assembly 44' includes a outwardly disposed cap generally indicated as 68 having a somewhat annular configuration defined at least in part by a platform portion 69. A plurality of spaced apart fingers 70 extend substantially perpendicularly outward from the exposed surface of the platform 69 and are separated by a plurality of spaces 72. The provision of the plurality of fingers 70 and alternately disposed spaces 72 facilitates the use of a wrench or like elongated, rigid material tool member (not shown) to cause rotation of the head assembly 44' relative to the housing 10 so as to accomplish attachment and detachment of these two components. Other features of the head assembly 44' include a valve seat 50' disposed and dimensioned to be sealingly engaged by the buoyant material valve member 40 as described in detail with reference to FIG. 5.

Further, the sealing assembly associated with the embodiment of FIGS. 9 through 11 comprises a sealing member preferably in the form of an O-ring 24' normally disposed in engaging, confronting relation with the undersurface 69' of the platform 69. Due to the relative dispositions and dimensions of both the O-ring 24' and the platform 69, the O-ring 24' is "clamped" or otherwise disposed in a fixed position between the undersurface 69' and the outer peripheral edge 14' of the upper open end 14 of the housing 10 in a manner such that the O-ring 24' extends outwardly from the platform 69 into an engageable sealing relation with an interior surface 20' of a permanently installed drain or sewer pipe 20.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A flood control valve assembly designed to be removably mounted within a permanently installed drain pipe, said assembly comprising:

a) a housing having a substantially elongated hollow interior terminating at oppositely disposed open outer and inner ends, b) said housing dimensioned to be disposed within the drain pipe adjacent to and along a length of an end portion thereof, c) an attachment assembly structured to removably secure said housing to said drain pipe and mounted on said housing and positionable outwardly therefrom into removable, connecting engagement with an interior surface of the drain pipe, d) a head assembly mounted at least partially within said housing adjacent said outer end and including a hollow interior and oppositely disposed open proximal and distal ends, e) said head assembly disposed and structured to at least partially define a flow path through said housing and including a valve seat mounted thereon, f) a valve member formed of a buoyant material and movably contained within said housing along at least a portion of said flow path, said valve member dimensioned and configured to sealingly engage said valve seat, g) said valve seat and said valve member cooperatively disposed and structured to automatically assume an open position during a flow of water into said housing through said open outer end and a closed position to prevent a flow of water out of said housing through said open outer end, and h) a sealing assembly disposed between an outer surface of said housing and an inner surface of said drain pipe to restrict passage of water between said housing and the drain pipe, said sealing assembly being movably mounted and selectively positionable on said outer surface of said housing between said outer and inner ends.

2. An assembly as recited in claim 1 wherein said sealing assembly is mounted adjacent said outer end of said housing and dimensioned and configured to extend outwardly therefrom into sealing engagement with the inner surface of the drain pipe.

3. An assembly as recited in claim 1 wherein said head assembly is removably mounted at least partially within said housing; said outer end of said housing dimensioned and configured to allow passage of said valve member therethrough and out of said of hollow interior upon removal of said head assembly from said housing.

4. An assembly as recited in claim 3 wherein said head assembly includes an end portion structured to facilitate mounting and removal of said head assembly relative to said housing.

5. An assembly as recited in claim 4 wherein said head assembly is threadedly connected to said housing and rotatable relative thereto for mounting and removal of said head assembly relative to said housing.

6. An assembly as recited in claim 5 wherein said housing comprises a first threaded portion integrally formed adjacent said outer end and extending inwardly therefrom along an interior surface of said housing; said head assembly comprising a second threaded portion integrally formed adjacent said proximal end thereof and extending along a length of an exterior surface thereof.

7. A flood control valve assembly designed to be removably mounted within a permanently installed drain pipe, said assembly comprising:
   a) a housing having a substantially elongated hollow interior terminating at oppositely disposed open outer and inner ends,
   b) said housing dimensioned to be disposed within the drain pipe adjacent to and along a length of an end portion thereof,
   c) an attachment assembly structured to removably secure said housing to said drain pipe and mounted on said housing and positionable outwardly therefrom into removable, connecting engagement with an interior surface of the drain pipe,
   d) said attachment assembly comprising at least one cross member adjustably mounted within said housing and having at least one end extending outwardly from said housing into removable, penetrating engagement with the drain pipe,
   e) a head assembly mounted at least partially within said housing adjacent said outer end and including a hollow interior and oppositely disposed open proximal and distal ends,
   f) said head assembly disposed and structured to at least partially define a flow path through said housing and including a valve seat mounted thereon,
   g) a valve member formed of a buoyant material and movably contained within said housing along at least a portion of said flow path, said valve member dimensioned and configured to sealingly engage said valve seat, and
   h) said valve seat and said valve member cooperatively disposed and structured to automatically assume an open position during a flow of water into said housing through said open outer end and a closed position to prevent a flow of water out of said housing through said open outer end.

8. An assembly as recited in claim 7 wherein said one cross member is disposed and dimensioned to extend across said hollow interior and into retaining relation with said valve member when said valve member is disposed in said opened position.

9. An assembly as recited in claim 7 wherein said attachment assembly comprises at least two cross members disposed in substantially transverse relation to one another within said housing, each of said cross members including opposite ends extending through said housing and into removable, penetrating engagement with the drain pipe; said two cross members disposed in retaining, engageable relation to said valve member when said valve member is in said open position.

10. An assembly as recited in claim 9 wherein each of said cross members is structured to be longitudinally adjustable so as to selectively vary the length thereof.

11. An assembly as recited in claim 10 wherein each of said cross members comprises a turnbuckle having opposite ends thereof including a sharpened configuration to facilitate penetrating engagement with the drain pipe.

12. A flood control valve assembly designed to be removably mounted within a permanently installed drain pipe, said assembly comprising:
   a) a housing having a substantially elongated hollow interior terminating at oppositely disposed open outer and inner ends,
   b) said housing dimensioned to be disposed within the drain pipe adjacent to and along a length of an end portion thereof,
   c) an attachment assembly structured to removably secure said housing to said drain pipe and mounted on said housing and positionable outwardly therefrom into removable, connecting engagement with an interior surface of the drain pipe,
   d) a head assembly mounted at least partially within said housing adjacent said outer end and including a hollow interior and oppositely disposed open proximal and distal ends,
   e) said head assembly disposed and structured to at least partially define a flow path through said housing and including a valve seat mounted thereon,
   f) said valve seat comprising a substantially annular configuration disposed on said head assembly between said proximal and distal ends in substantially surrounding relation to a portion of said flow path, said valve seat at least partially defined by a transitional, tapered portion integrally formed on an interior surface of said assembly intermediate said proximal and distal end,
   g) said proximal end comprising a first transverse dimension and said distal end comprising a second transverse dimension greater than said first transverse dimension,
   h) a valve member formed of a buoyant material and movably contained within said housing along at least a portion of said flow path, said valve member dimensioned and configured to sealingly engage said valve seat, and
   i) said valve seat and said valve member cooperatively disposed and structured to automatically assume an open position during a flow of water into said housing through said open outer end and a closed position to prevent a flow of water out of said housing through said open outer end.

13. An assembly as recited in claim 12 wherein said valve member comprises a substantially spherical configuration having a diameter greater than said first transverse dimension and lesser than said second transverse dimension; said valve member dimensioned and configured to pass through said distal end and into sealing engagement with said valve seat to restrict flow of water in a single direction only along said flow path.

14. An assembly as recited in claim 12 wherein said valve seat is disposed substantially contiguous to said distal end and includes a transverse dimension smaller than a transverse dimension of said valve member.

15. An assembly as recited in claim 14 wherein said valve member comprises a substantially spherical configuration having a diameter greater than said transverse dimension of said valve seat.

16. A flood control valve assembly designed to be mounted on a permanently installed drain pipe, said assembly comprising:
- a) a housing having a substantially elongated hollow interior terminating at oppositely disposed open outer and inner ends,
- b) said housing dimensioned to be disposed within the drain pipe adjacent to and along a length of an end portion thereof,
- c) an attachment assembly structured to removably secure said housing to said drain pipe and mounted on said housing and positionable outwardly therefrom into removable, connecting engagement with an interior surface of the drain pipe,
- d) a head assembly mounted at least partially within said housing adjacent said outer end and including a hollow interior and oppositely disposed open proximal and distal ends,
- e) said head assembly disposed and structured to at least partially define a flow path through said housing and including a valve seat mounted thereon,
- f) a valve member formed of a buoyant material and movably contained within said housing along at least a portion of said flow path, said valve member dimensioned and configured to sealingly engage said valve seat,
- g) said attachment assembly disposed and dimensioned to extend across said hollow interior and into retaining relation with said valve member, and
- h) said valve seat and said valve member cooperatively disposed and structured to automatically assume an open position during a flow of water into said housing through said open outer end and a closed position during flow of water into said housing through said open inner end, wherein flow of water out of said housing through said open outer end is prevented.

* * * * *